UNITED STATES PATENT OFFICE.

HEINRICH JORDAN AND WILHELM NEELMEIER, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 916,323.  Specification of Letters Patent.  Patented March 23, 1909.

Application filed December 29, 1908. Serial No. 469,773.

*To all whom it may concern:*

Be it known that we, HEINRICH JORDAN and WILHELM NEELMEIER, doctors of philosophy, chemists, citizens of the German Empire, residing at Leverkusen, Germany, Kingdom of Prussia, have invented new and useful Improvements in New Azo Dye, of which the following is a specification.

The present invention relates to the manufacture and production of new disazo dyestuffs capable of dyeing unmordanted cotton. The process for their production consists in combining tetrazo compounds prepared from para-diamins, with one molecule of a 1-acidylamino-8-naptholmono-, di- or polysulfonic acid or with one molecule of a derivative thereof, and then combining the intermediate compounds thus formed with one molecule of a monoacetylized meta-diamin in which the hydrogen in the benzene nucleus in para-position to the non-substituted amino group has not been replaced by other groups or with one molecule of a derivative of the latter compounds, or vice versa. The new dyestuffs thus obtained are in the shape of their alkaline salts dark powders soluble in water. Upon reduction with zinc dust and acetic acid they are decomposed, a para-diamin, an 1-acidylamino-7-amino-8-naphthol sulfonic acid and a monoacetylized triamin being formed. They dye unmordanted cotton generally from red to violet shades. The dyes can be diazotized on the fiber and further combined with amins or phenols. If for instance combined with beta-naphthol, they generally produce pure blue shades, which on being discharged with hydrosulfite leave a pure white.

In order to illustrate the new process more fully the following example is given, the parts being by weight: 244 parts of dianisidin are diazotized in the usual manner by means of 138 parts of sodium nitrite and the necessary quantity of hydrochloric acid; the free hydrochloric acid is almost completely neutralized with sodium carbonate and an aqueous solution of 405 parts of 1-acetylamino-8-naphthol-4,6-disulfonate of sodium and 300 parts of sodium carbonate in water is then added to the tetrazo compound which has to be well stirred and the temperature of which has to be kept at about 10° C. When the formation of the intermediate compound is complete a solution of 164 parts of 4-acetylamino-2-aminotoluene in water is added and the mixture is stirred for about two days until the formation of the disazodyestuff is complete. The solution is now heated with continuous stirring for some hours to from 40—60° C. and the dyestuff is then precipitated by the addition of common salt, filtered off and dried. The new dye thus obtained is in the shape of its sodium salt a dark powder which is soluble in water with a reddish-violet color and which is soluble in concentrated sulfuric acid with a blue color. By reduction with zinc dust and acetic acid, dianisidin, 1-acetylamino-7-amino-8-naphthol-4,6-disulfonic acid and 1-acetylamino-3,6-diamino-4-methylbenzene are obtained. The new dyestuff dyes unmordanted cotton violet shades, which after diazotation on the fiber and combination with beta-naphthol, change into pure greenish-blue shades fast to washing leaving after being discharged with hydrosulfite a pure white.

The process is carried out in an analogous manner on using other para-diamins, e. g. benzidin, tolidin, ethoxy-benzidin, benzidin sulfonic acids etc. or on using other of the above mentioned azo dyestuff components, e. g. benzoyl- or acetyl-1,8-aminonaphthol-3,6-disulfonic acid, acetyl-1,8-aminonaphthol-4-sulfonic acid, benzoyl-1,8-aminonaphthol-4,6-disulfonic acid and on the other hand instead of 4-acetylamino-2-aminotoluene: 4-acetylamino-2-aminoanisol, 4-acetylamino-2-aminophenetol, acetyl-meta-phenylenediamin, acetyl-chloro-meta-phenylenediamin, mono-acetylmetadiaminophenylether etc.

Having now described our invention and in what manner the same is to be performed, what we claim as new and desire to secure by Letters Patent is:—

1. The herein-described new azo dyestuffs obtainable from para-diamins, acidyl-peri-aminonaphthol sulfonic acids and mono-acetylized meta-diamins in which the hydrogen in the benzene nucleus in para position to the non-substituted amino group has not been replaced by other groups, which dyestuffs are, after being dried and pulverized, in the shape of their alkaline salts dark powders soluble in water, yielding upon reduction with zinc dust and acetic acid an 1-acidylamino-7-amino-8-naphthol-sulfonic acid, a diamin and an acetyl-triamin, and dyeing cotton from red to violet shades; which after diazotation on the fiber and combination with beta-naphthol change into blue shades fast to washing leaving after being discharged with hydrosulfite a pure white, substantially as described.

2. The herein-described new azo dyestuff which can be obtained from dianisidin, 1-acetylamino-8-naphthol-4.6-disulfonic acid and 4-acetylamino-2-aminotoluene, which dyestuff is, after being dried and pulverized, in the shape of its sodium salt a dark powder, which is soluble in water with a reddish-violet color, and which is soluble in concentrated sulfuric acid with a blue color; yielding upon reduction with zinc dust and acetic acid dianisidin, 1-acetylamino-7-amino-8-naphthol-4.6-disulfonic acid and 1-acetylamino-3.6-diamino-4-methylbenzene; dyeing cotton violet shades which after diazotation on the fiber and combination with beta-naphthol change into pure greenish-blue shades fast to washing and leaving after being discharged with hydrosulfite a pure white, substantially as described.

In testimony whereof we have hereunto set our hands in the presence of two subscribing witnesses.

HEINRICH JORDAN. [L. S.]
WILHELM NEELMEIER. [L. S.]

Witnesses:
OTTO KÖNIG,
WALTER EPKISKAMP.